United States Patent
Lin et al.

(10) Patent No.: US 8,020,443 B2
(45) Date of Patent: Sep. 20, 2011

(54) TRANSDUCER WITH DECOUPLED SENSING IN MUTUALLY ORTHOGONAL DIRECTIONS

(75) Inventors: Yizhen Lin, Gilbert, AZ (US); Andrew C. McNeil, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 439 days.

(21) Appl. No.: 12/262,042

(22) Filed: Oct. 30, 2008

(65) Prior Publication Data

US 2010/0107763 A1  May 6, 2010

(51) Int. Cl.
    *G01P 15/125* (2006.01)
(52) U.S. Cl. ................................. 73/514.32
(58) Field of Classification Search ........... 73/514.32, 73/510, 514.38, 514.36, 514.18
    See application file for complete search history.

(56) References Cited

U.S. PATENT DOCUMENTS

| | | | |
|---|---|---|---|
| 6,845,670 B1 | 1/2005 | McNeil et al. | |
| 6,936,492 B2 | 8/2005 | McNeil et al. | |
| 6,955,086 B2 * | 10/2005 | Yoshikawa et al. | 73/514.32 |
| 7,121,141 B2 | 10/2006 | McNeil | |
| 7,140,250 B2 | 11/2006 | Leonardson et al. | |
| 7,146,856 B2 * | 12/2006 | Malametz | 73/514.32 |
| 7,578,190 B2 * | 8/2009 | Lin et al. | 73/514.29 |
| 7,610,809 B2 * | 11/2009 | McNeil et al. | 73/514.32 |
| 7,624,638 B2 * | 12/2009 | Konno et al. | 73/514.32 |
| 2004/0231420 A1 | 11/2004 | Xie et al. | |

FOREIGN PATENT DOCUMENTS

| JP | 2008-258087 | 10/2008 |
|---|---|---|
| WO | 2004/010150 | 1/2004 |

OTHER PUBLICATIONS

PCT/US2009/059499 International Search Report and Written Opinion mailed May 17, 2010.

* cited by examiner

*Primary Examiner* — Helen C. Kwok
(74) *Attorney, Agent, or Firm* — Meschkow & Gresham, P.L.C.

(57) ABSTRACT

A microelectromechanical systems (MEMS) transducer (90) is adapted to sense acceleration in mutually orthogonal directions (92, 94, 96). The MEMS transducer (90) includes a proof mass (100) suspended above a substrate (98) by an anchor system (116). The anchor system (116) pivotally couples the proof mass (100) to the substrate (98) at a rotational axis (132) to enable the proof mass (100) to rotate about the rotational axis (132) in response to acceleration in a direction (96). The proof mass (100) has an opening (112) extending through it. Another proof mass (148) resides in the opening (112), and another anchor system (152) suspends the proof mass (148) above the surface (104) of the substrate (98). The anchor system (152) enables the proof mass (148) to move substantially parallel to the surface (104) of the substrate (98) in response to acceleration in at least another direction (92, 94).

20 Claims, 4 Drawing Sheets

TRANSDUCER WITH DECOUPLED SENSING IN MUTUALLY ORTHOGONAL DIRECTIONS

TECHNICAL FIELD OF THE INVENTION

The present invention relates generally to microelectromechanical systems (MEMS) sensors. More specifically, the present invention relates to a MEMS accelerometer with decoupled sensing in mutually orthogonal directions.

BACKGROUND OF THE INVENTION

An accelerometer is a sensor typically utilized for measuring acceleration forces. These forces may be static, like the constant force of gravity, or they can be dynamic, caused by moving or vibrating the accelerometer. An accelerometer may sense acceleration or other phenomena along one, two, or three axes or directions. From this information, the movement or orientation of the device in which the accelerometer is installed can be ascertained. Accelerometers are used in inertial guidance systems, in airbag deployment systems in vehicles, in protection systems for a variety of devices, and many other scientific and engineering systems.

Capacitive-sensing MEMS accelerometer designs are highly desirable for operation in high gravity environments and in miniaturized devices, due to their relatively low cost. Capacitive accelerometers sense a change in electrical capacitance, with respect to acceleration, to vary the output of an energized circuit. One common form of accelerometer is a capacitive transducer having a "teeter-totter" or "see saw" configuration. This commonly utilized transducer type uses a movable element or plate that rotates under z-axis acceleration above a substrate. The accelerometer structure can measure at least two distinct capacitances to determine differential or relative capacitance.

Referring to FIGS. 1 and 2, FIG. 1 shows a top view of a prior art capacitive-sensing MEMS sensor 20 constructed as a conventional hinged or "teeter-totter" type accelerometer, and FIG. 2 shows a side view of MEMS sensor 20. MEMS sensor 20 includes a static substrate 22 and a movable element 24 spaced from substrate 22, each of which have opposed planar faces. Substrate 22 has a number of conductive electrode elements 26 of a predetermined configuration deposited on a substrate surface 28 to form capacitor electrodes or "plates." In an exemplary scenario, electrode elements 26 may operate as excitation or sensing electrodes to receive stimulating signals. Electrode elements 26 may additionally operate as a feedback electrodes when a feedback signal is superimposed on the sensing signal.

Movable element 24, commonly referred to as a "proof mass," is flexibly suspended above substrate 22 by one or more suspension anchors, or rotational flexures 30, for enabling movable element 24 to pivot or rotate about a rotational axis 32 to form capacitors 34 and 36, labeled C1 and C2, with electrode elements 26. Movable element 24 moves in response to acceleration, thus changing its position relative to the static sensing electrode elements 26. This change in position results in a set of capacitors whose difference, i.e., a differential capacitance, is indicative of acceleration in a direction 37.

When intended for operation as a teeter-totter type accelerometer, a section 38 of movable element 24 on one side of rotational axis 32 is formed with relatively greater mass than a section 40 of movable element 24 on the other side of rotational axis 32. The greater mass of section 38 is typically created by offsetting rotational axis 32. That is, a length 42 between rotational axis 32 and an end 44 of section 38 is greater than a length 46 between rotational axis 32 and an end 48 of section 40. In addition, electrode elements 26 are sized and spaced symmetrically with respect to rotational axis 32 and a longitudinal axis 50 of movable element 24.

The device shown in FIGS. 1 and 2 is a single axis accelerometer which senses acceleration only along the Z axis. However, some applications require the ability to sense acceleration along two or three mutually orthogonal axes. In addition, many MEMS sensor applications require compact size and low cost packaging to meet aggressive cost targets.

Referring now to FIGS. 3 and 4, FIG. 3 shows a top view of a prior art multiple axis MEMS sensor 52, and FIG. 4 shows a side view of multiple axis MEMS sensor 52. MEMS sensor 52 includes a proof mass 54 attached to a number of anchors 56 by a series of springs 58 that are preferably compliant in three mutually orthogonal directions. Anchors 56 are mounted on a die or other substrate 60. Proof mass 54 of MEMS sensor 52 includes X sense fingers 62 and Y sense fingers 64. Each X sense finger 62 is surrounded by two fixed fingers 66 and 68 formed on substrate 60. Likewise, each Y sense finger 64 is surrounded by two fixed fingers 70 and 72 formed on substrate 60. When MEMS sensor 52 experiences acceleration along an X axis 74, the distance between X sense fingers 62 and the adjacent fixed fingers 66 and 68 changes, thus changing the capacitance between these fingers. This change in capacitance is registered by the sense circuitry (not shown) and converted to an output signal representative of the acceleration along X axis 74. Acceleration along a Y axis 76 is sensed in an analogous manner by registering the change in capacitance between Y sense fingers 64 and the corresponding fixed fingers 70 and 72.

Proof mass 54 has opposing sides 78 and 80 which are of unequal mass. This is accomplished by constructing proof mass 54 such that the opposing sides 78 and 80 are essentially equal in thickness and width, but unequal in length. Consequently side 78 has greater mass than side 80, thus causing proof mass 54 to rotate relative to Y axis 76 in response to acceleration along a Z axis 82. This acceleration is sensed by capacitive plates 84 and 86 which are disposed beneath proof mass 54.

The design of MEMS sensor 52 enables a very compact transducer size. In this configuration, XY sensing is coupled with the Z-axis sensing through springs 58. As such, springs 58 need to work as both XY (i.e., linear) springs and Z (i.e., torsional) springs. Unfortunately, it is difficult to optimize the design of springs 58 for both XY (i.e., linear) and Z (i.e., torsional) movement which can result in cross-axis sensing error.

Under acceleration along Z axis 82, the pivot location of proof mass 54 shifts from one end or the other of proof mass 54 since anchors 56 and springs 58 are not centered at a single rotational axis. This "sagging" results in an undesirable second order nonlinearity effect which decreases measurement accuracy and/or increases the complexity of sense circuitry for feedback closed-loop control. Furthermore, the pivot location may change with acceleration frequency so that the common mode and differential mode could have different damping and modal frequency exacerbating the nonlinearity effects.

MEMS sensor applications are calling for lower temperature coefficient of offset (TCO) specifications. The term "offset" refers to the output deviation from its nominal value at the non-excited state of the MEMS sensor. Thus, TCO is a measure of how much thermal stresses effect the performance of a semiconductor device, such as a MEMS sensor. The packaging of MEMS sensor applications often uses materials with dissimilar coefficients of thermal expansion. Thus, an undesirably high TCO can develop during manufacture or operation. These thermal stresses, as well as stresses due to moisture and assembly processes, can result in deformation of the underlying substrate, referred to herein as package stress. The multiple locations of the non-centered anchors 56 on the underlying substrate of MEMS sensor 52 makes it more prone to measurement inaccuracies due to package stress.

Accordingly, what is needed is a compact transducer that can sense along two or more mutually orthogonal axes and that decouples XY sensing from Z sensing to enable optimization of the springs for their corresponding sensing axis and to reduce nonlinearity effects. What is further needed is a compact transducer with reduced sensitivity to package stress.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION

Figures 5, 6:
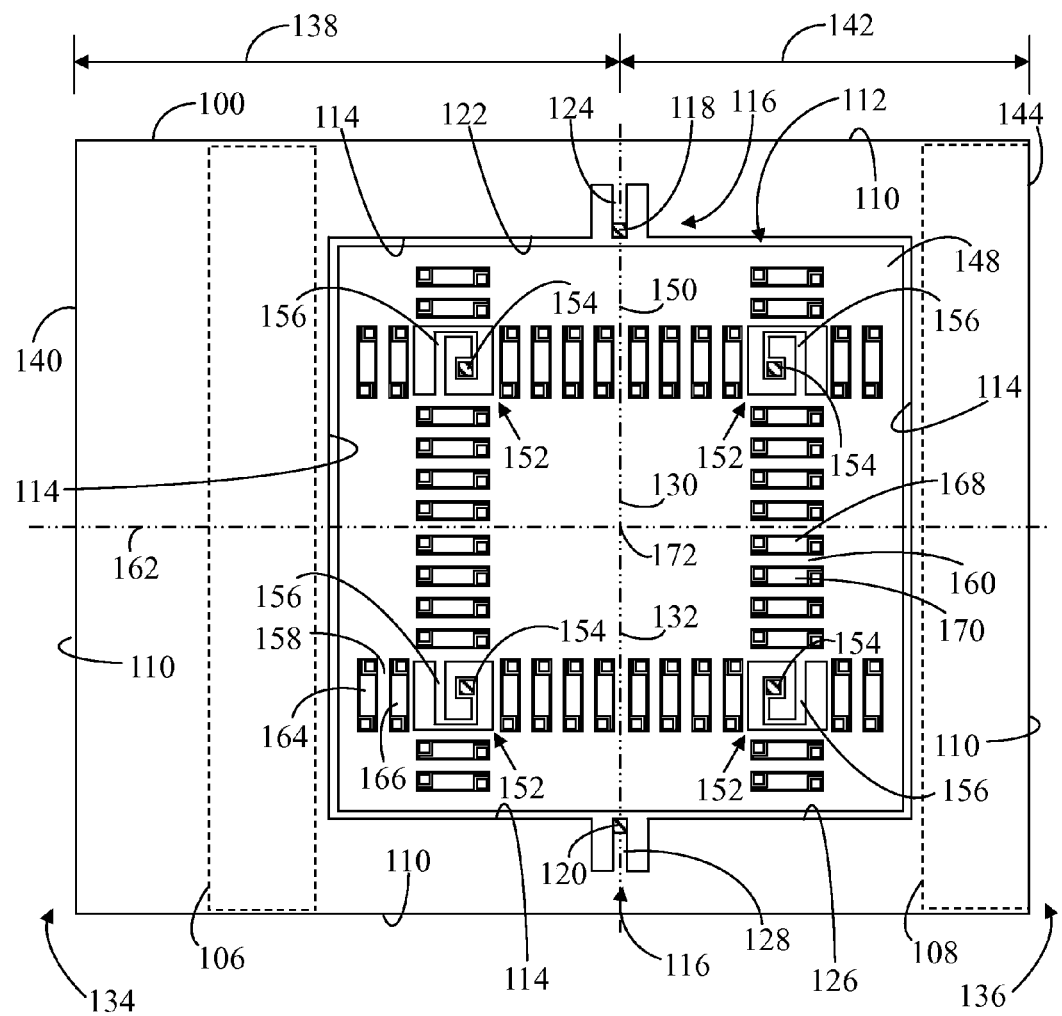
FIG. 5 shows a top view of a multiple axis MEMS sensor in accordance with an embodiment of the invention.
FIG. 6 shows a side view of the MEMS sensor of FIG. 5.

Referring to FIGS. 5-6, FIG. 5 shows a top view of a microelectromechanical systems (MEMS) sensor 90 in accordance with an embodiment of the invention, and FIG. 6 shows a side view of the MEMS sensor 90. Sensor 90 may be, for example, a capacitive-sensing accelerometer or another MEMS sensing device. In one embodiment, MEMS sensor 90 is a multiple axis sensor adapted to sense acceleration in at least two mutually orthogonal directions. More specifically, MEMS sensor 90 senses acceleration in a direction 92 corresponding to an X axis, a direction 94 corresponding to a Y axis, and a direction 96 corresponding to a Z axis. For clarity, direction 92 is referred to hereinafter as X direction 92, direction 94 is referred to as Y direction 94, and direction 96 is referred to as Z direction 96. Although MEMS sensor 90 is described herein as sensing acceleration in three mutually orthogonal directions, it should be understood that MEMS sensor 90 may be adapted to sense acceleration in two mutually orthogonal directions, for example, X direction 92 and Z direction 96.

MEMS sensor 90 includes a substrate 98 and a movable element, referred to herein as a proof mass 100, spaced from substrate 98, each of which have opposed planar faces. A static conductive layer 102 is deposited on a surface 104 of substrate 98. Static conductive layer 102 is in the form of at least two electrically isolated electrodes or plates, including, for example, an electrode element 106 and electrode element 108. Electrode elements 106 and 108 may operate as excitation or sensing electrodes to receive stimulating signals. Electrode elements 106 and 108 may additionally operate as a feedback electrodes when a feedback signal is superimposed on the sensing signal.

Proof mass 100 is positioned in parallel spaced relation above surface 104 of substrate 98. That is, proof mass 100 is suspended above surface 104 and does not contact surface 104. Proof mass 100 is a generally planar structure having an outer peripheral wall 110 and an opening 112 delineated by an inner peripheral wall 114. Proof mass 100 is suspended above and pivotally coupled to substrate 98 by an anchor system 116. Anchor system 116 includes suspension anchors, referred to herein as pivot elements 118 and 120, formed on surface 104 of substrate 98. More specifically, pivot element 118 is attached to proof mass 100 at a side 122 of inner peripheral wall through, for example, a tether 124. Likewise, pivot element 120 is attached to proof mass 100 at another side 126 of inner peripheral wall 114 opposing side 122 through, for example, another tether 128.

Pivot elements 118 and 120 of anchor system 116 are located along a centerline 130 of opening 112 to form a rotational axis 132 located at centerline 130. Pivot elements 118 and 120 enable proof mass 100 to pivot or rotate about rotational axis 132 to form capacitors (see FIG. 2) between proof mass 100 with respective electrode elements 106 and 108. Thus, proof mass 100 is constructed as a hinged or "teeter-totter" type accelerometer. Only two electrode elements 106 and 108 are shown in FIG. 5 for simplicity of illustration. However, in alternative embodiments, MEMS sensor 90 may include a different quantity and/or different configuration of electrode elements. In addition, it should be understood that a number of flexures, hinges, and other rotational mechanisms may be utilized to enable pivotal movement of proof mass 100 about rotational axis 132.

A section 134 of proof mass 100 on one side of rotational axis 132 is formed with relatively greater mass than a section 136 of proof mass 100 on the other side of rotational axis 132. The greater mass of section 134 is created by offsetting rotational axis 132. That is, a length 138 between rotational axis 132 and an end 140 of section 134 is greater than a length 142 between rotational axis 132 and an end 144 of section 136. Electrode element 106 faces section 134 of proof mass 100 and electrode element 108 faces section 136 of proof mass 100. In addition, electrode elements 106 and 108 are sized and spaced symmetrically with respect to rotational axis 132 of proof mass 100. That is, each of electrode elements 106 and 108 is offset an equivalent distance 146 on opposing sides of rotational axis 132.

In the embodiment shown, an imbalance of mass between sections 134 ands 136 is formed by offsetting rotational axis 132 in order for MEMS sensor 90 to perform its sensing function in Z direction 96. In alternative embodiments, however, section 134 may be formed with relatively greater mass with rotational axis 132 geometrically centered between ends 140 and 144 of proof mass 100. For example, section 134 may be weighted with a material layer to increase its mass relative to section 136. Alternatively, apertures may be formed through section 136 to reduce its mass relative to section 134.

Proof mass 100 moves in response to acceleration in Z direction 96 substantially parallel to the Z axis, thus changing its position relative to the static electrode elements 106 and 108. Accordingly, electrode elements 106 and 108 are adapted to detect movement of proof mass 100 along an axis that is perpendicular to a plane of electrode elements 106 and 108. This change in position results in a set of capacitors whose difference, i.e., a differential capacitance, is indicative of acceleration in Z direction 96. The term "static" utilized herein refers to conductive layer 102 and electrode elements 106 and 108 that are stationary relative to proof mass 100. That is, while proof mass 100 may rotate or pivot on pivot elements 118 and 120 of pivot system 116 about rotational axis 132, conductive layer 102 (including electrode elements 106 and 108) does not pivot, rotate, or otherwise move relative to proof mass 100.

Figure 1:
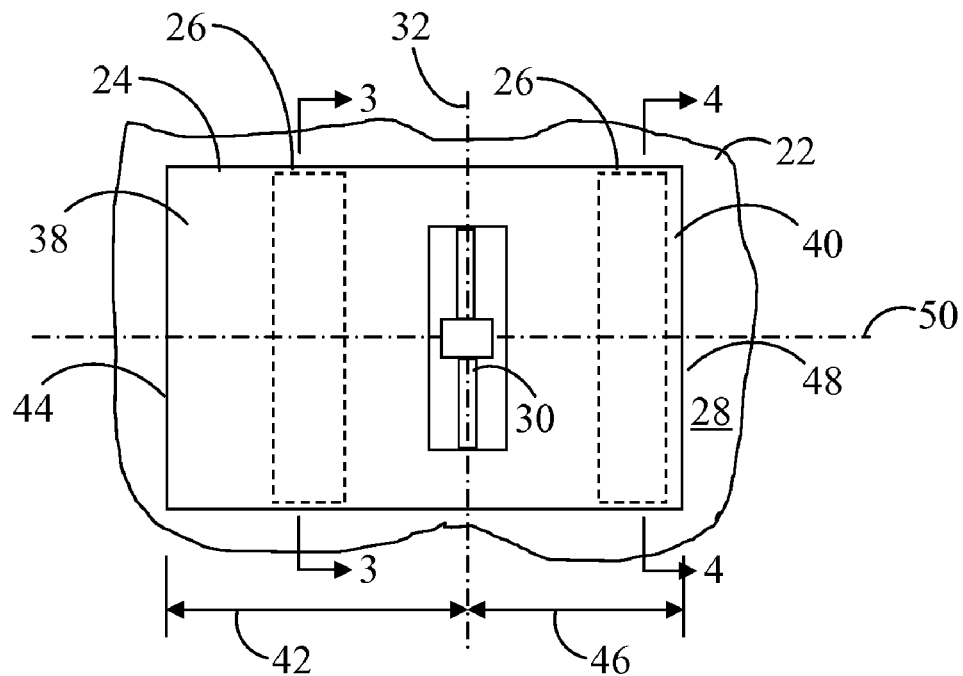
FIG. 1 shows a top view of a prior art capacitive-sensing MEMS sensor constructed as a conventional hinged or "teeter-totter" type accelerometer.
Figure 2:
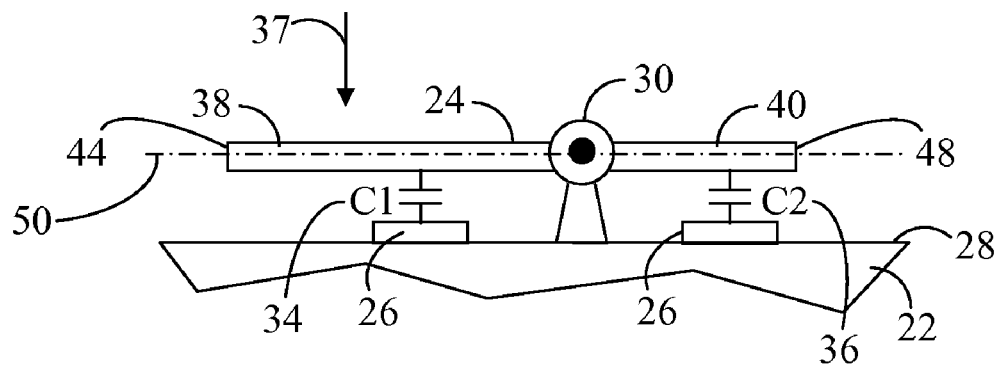
FIG. 2 shows a side view of the MEMS sensor of FIG. 1.
Figure 3:
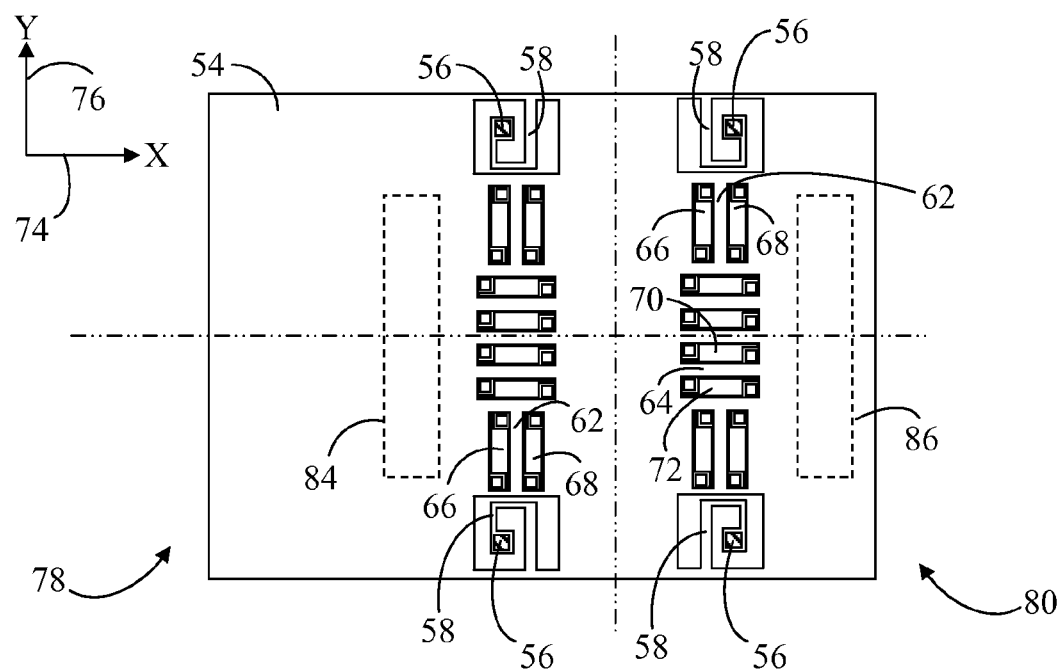
FIG. 3 shows a top view of a prior art multiple axis MEMS sensor.
Figure 4:
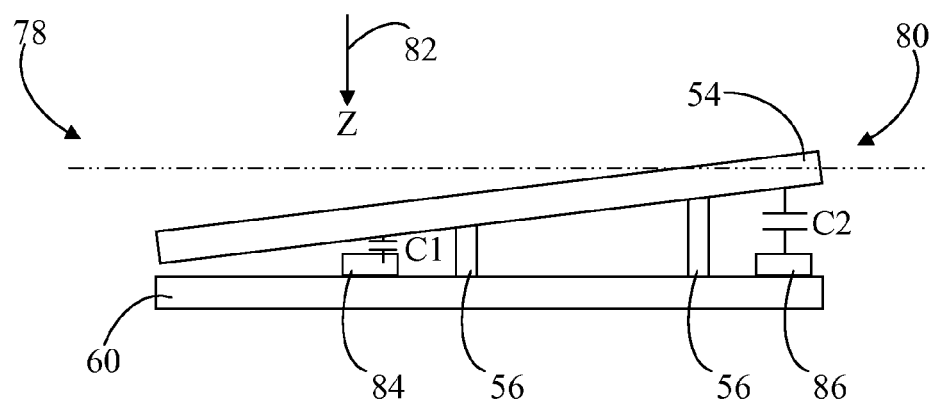
FIG. 4 shows a side view of the multiple axis MEMS sensor of FIG. 3.

In the conventional art single axis design of MEMS sensor 20 shown in FIGS. 1 and 2, the area of movable element 24 surrounding rotational axis 32 and bounded by electrode elements 26 does not contribute to sensing in direction 37 (Z axis sensing). Rather, MEMS sensor 20 has undesirably high damping and reduced natural frequency as compared with dual axis XY displacement sensors due to the physical nature of the configuration. This high damping results in a lower rolloff frequency. For prior art three axis sensors, such as MEMS sensor 52 (FIGS. 3-4), the XY sensing axes often have less damping than required, while the Z axis has more damping than required. A compromise in prior art three axis transducers is to cap the device at higher bonding pressure to increase the XY damping. However, this results in even lower rolloff frequency in the Z axis. By forming opening 112 in proof mass 100, Z axis rolloff frequency can be increased without sacrificing sensitivity of sensing in Z direction 96.

MEMS sensor 90 further includes a proof mass 148 residing in opening 112 and positioned in parallel spaced apart relation above surface 104 of substrate 98. Proof mass 148 exhibits a centerline 150 that is coaxial with centerline 130 of opening 112. In addition, centerline 150 of proof mass 148 is coincident with rotational axis 132. By positioning proof mass 148 within opening 112, a compact multiple axis transducer design is achieved to meet the ever increasing demand for MEMS sensor applications requiring compact size and low cost packaging.

Proof mass 148 is suspended above and coupled to substrate 98 by an anchor system 152 in the form of multiple anchors 154 formed on surface 104 of substrate 98. Anchors 154 are connected to proof mass 148 via spring elements 156. Spring elements 156 are compliant linear springs that enable proof mass 148 to move substantially parallel to surface 104 in response to acceleration in either of X direction 92 and Y direction 94. Thus, proof mass 148 is enabled for XY sensing. In one embodiment, spring elements 156 have similar stiffness in X direction 92 and Y direction 94 in order to sense a similar magnitude acceleration along the two orthogonal sense axes.

Proof mass 148 of MEMS sensor 90 includes X sense fingers 158 aligned with centerline 150 of proof mass 148. Proof mass 148 further includes Y sense fingers 160 aligned with another centerline 162 of proof mass 148 that is arranged orthogonal to centerline 150. Each X sense finger 158 is surrounded by two fixed fingers 164 and 166 formed on substrate 98. Likewise, each Y sense finger 160 is surrounded by two fixed fingers 168 and 170 formed on substrate 98. When MEMS sensor 90 experiences acceleration in X direction 92, the distance between X sense fingers 158 and the adjacent fixed fingers 164 and 166 changes, thus changing the capacitance between these fingers. This change in capacitance is registered by the sense circuitry (not shown) and converted to an output signal representative of the acceleration in X direction 92. Acceleration in Y direction 94 is sensed in an analogous manner by registering the change in capacitance between Y sense fingers 160 and the corresponding fixed fingers 168 and 170.

In this embodiment, centerline 150 is a first axis of symmetry of proof mass 148 and centerline 162 arranged orthogonal to centerline 150 is a second axis of symmetry of proof mass 148. In general, anchors 154 of anchor system 152 are offset from centerlines 150 and 162 and symmetrically arranged relative to centerlines 150 and 162. That is, each of anchors 154 is offset an equivalent distance from each of centerlines 150 and 162. This configuration of anchors 154 results in proof mass 148 being centered, or balanced at an intersection 172 of centerlines 150 and 170. X sense fingers 158 and Y sense fingers 160 may also be symmetrically arranged relative to centerlines 150 and 170 of proof mass 148. The symmetrical configuration of proof mass 148 results in thermally induced stresses that are generally the same on either side of centerlines 150 and 162. Thus, the effects of thermally induced stresses on proof mass 148 that might otherwise effect the accuracy of sensing in X direction 92 and Y direction 94 is reduced.

It should be particularly noted that anchor system 152 for proof mass 148 is mechanically decoupled from, i.e., distinct from, anchor system 116 for proof mass 100. This configuration enables optimization of the design of pivot elements 118 and 120 and tethers 124 and 128 for Z axis sensing in Z direction 96 and optimization of the design of spring elements 156 for XY sensing in X direction 92 and Y direction 94. Furthermore, since Z axis sensing is de-coupled from XY axis sensing, cross axis sensing is largely eliminated. This is illustrated in FIG. 6 in which proof mass 100 rotates about rotational axis 132 in response to acceleration in Z direction 96. However, since proof mass 148 is decoupled from proof mass 100 due to its independent anchor system 152, proof mass 148 does not pivot or rotate in correspondence with proof mass 100. That is, proof mass 148 remains spaced apart from and substantially parallel to surface 104 of the underlying substrate 98.

Figure 7:
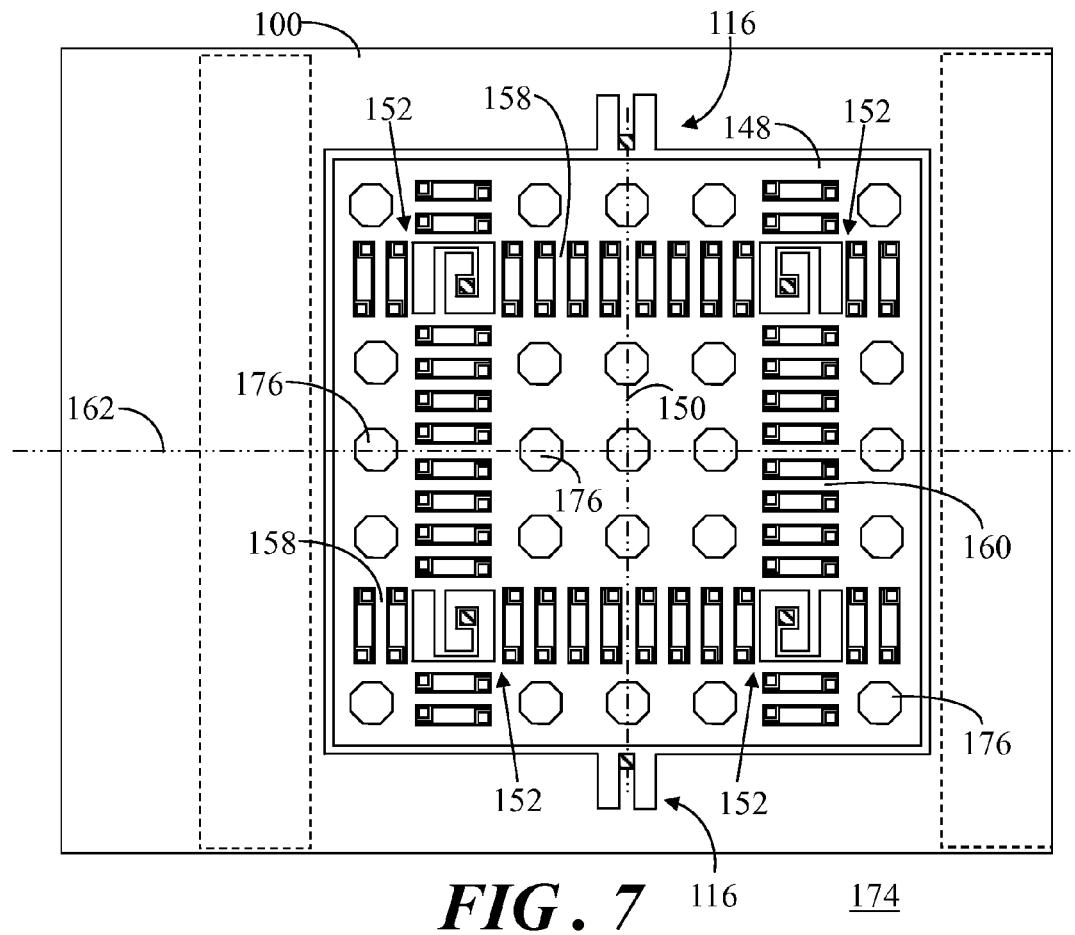
FIG. 7 shows a top view of a multiple axis MEMS sensor in accordance with another embodiment of the invention.

FIG. 7 shows a top view of a multiple axis MEMS sensor 174 in accordance with another embodiment of the invention. The design of MEMS sensor 174 is similar to that of MEMS sensor 90. That is, MEMS sensor 174 includes substrate 98 (not visible), proof mass 100 suspended above and pivotally coupled to substrate 98 by anchor system 116, and proof mass 148 suspended above and coupled to substrate 98 by anchor system 152. These features are discussed above in connection with FIGS. 5-6 and their descriptions and advantages are not repeated herein for brevity.

In some instances, it may be desirable to increase the mass of proof mass 148 so as to increase the XY sensing sensitivity of X sense fingers 158 and Y sense fingers 160. That is, if the mass of proof mass 148 is increased, the greater potential it has to displace in either of X or Y directions 92 and 94 even at very low accelerations. Accordingly, MEMS sensor 174 further includes a material 176 symmetrically arranged on proof mass 148 relative to centerlines 150 and 162 of proof mass 148. Material 176 may be, for example, a metal or other suitable material disposed on proof mass 148. Material 176 may be deposited and patterned per known processes. Material 176 functions to increase the mass of proof mass 148. As a result, the sensitivity of XY sensing of X sense fingers 158 and Y sense fingers 160 can be effectively increased.

Figure 8:
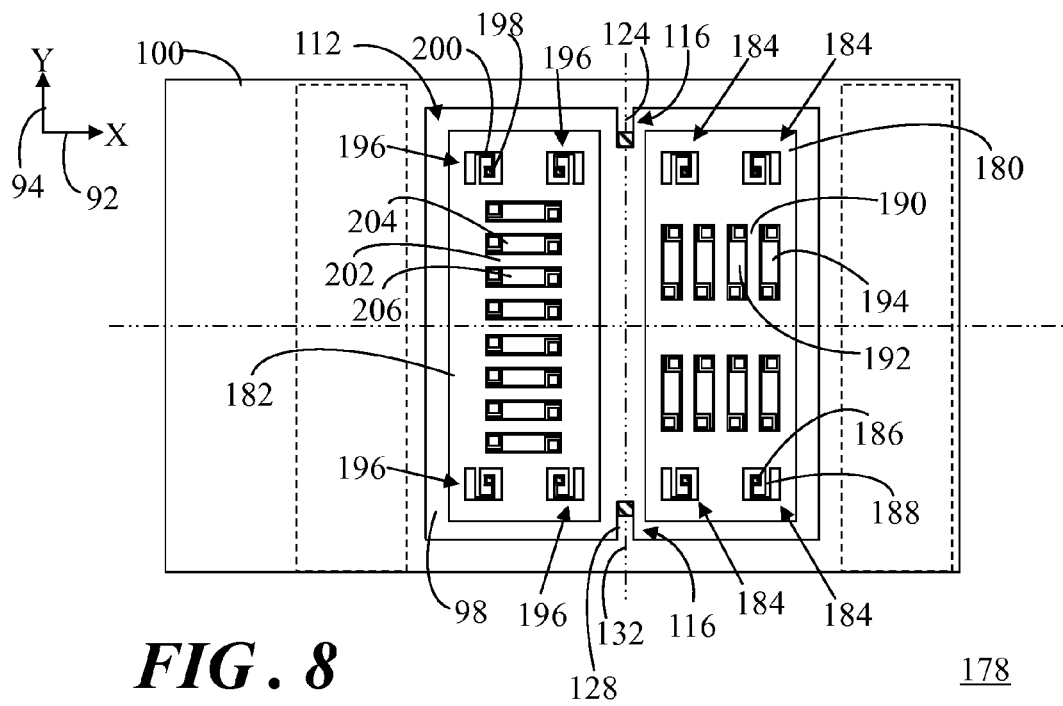
FIG. 8 shows a top view of a multiple axis MEMS sensor in accordance with another embodiment of the invention.

FIG. 8 shows a top view of a multiple axis MEMS sensor 178 in accordance with another embodiment of the invention. The design of MEMS sensor 178 is similar to that of MEMS sensor 90. That is, MEMS sensor 178 includes substrate 98 and proof mass 100 suspended above and pivotally coupled to substrate 98 by anchor system 116. These features are discussed above in connection with FIGS. 5-6 and their descriptions and advantages are not repeated herein for brevity. In some instances, it may be desirable to mechanically decouple X direction sensing from Y direction sensing. Accordingly, a proof mass 180 and a proof mass 182 reside in opening 112 of proof mass 100.

Proof mass 180 is suspended above and coupled to substrate 98 by an anchor system 184 in the form of multiple anchors 186 formed on substrate 98. Anchors 186 are connected to proof mass 180 via spring elements 188. Proof mass 180 further includes X sense fingers 190 aligned with rotational axis 132 of proof mass 100. Each X sense finger 190 is surrounded by two fixed fingers 192 and 194 formed on the underlying substrate 98. Spring elements 188 are compliant linear springs that enable proof mass 180 to move substantially parallel to substrate in response to acceleration in X direction 92. Thus, when MEMS sensor 178 experiences acceleration in X direction 92, the distance between X sense fingers 190 and the adjacent fixed fingers 192 and 194 changes, thus changing the capacitance between these fingers. This change in capacitance is registered by the sense circuitry (not shown) and converted to an output signal representative of the acceleration in X direction 92.

Proof mass 182 is suspended above and coupled to substrate 98 by an anchor system 196 in the form of multiple anchors 198 formed on substrate 98. Anchors 198 are connected to proof mass 182 via spring elements 200. Proof mass 182 further includes Y sense fingers 202 arranged orthogonal to rotational axis 132 of proof mass 100. Each Y sense finger 202 is surrounded by two fixed fingers 204 and 206 formed on the underlying substrate 98. Spring elements 200 are compliant linear springs that enable proof mass 182 to move substantially parallel to substrate in response to acceleration in Y direction 94. Thus, when MEMS sensor 178 experiences acceleration in Y direction 94, the distance between Y sense fingers 202 and the adjacent fixed fingers 204 and 206 changes, thus changing the capacitance between these fingers. This change in capacitance is registered by the sense circuitry (not shown) and converted to an output signal representative of the acceleration in Y direction 94.

It should be particularly noted in this embodiment that in addition to the distinct anchor system 116 for proof mass 100, proof mass 182 is suspended by anchor system 196 that is distinct from anchor system 184 for proof mass 180. Accordingly, any cross axis sensing between X direction 92 and Y direction 94 is also largely eliminated. In addition, distinct anchors 186 and 198 allow a designer to have a different stiffness in X direction 92 versus Y direction 94 in order to sense different magnitudes of acceleration along the two orthogonal sense axes. Furthermore, the configuration of MEMS sensor 178 offers greater flexibility for the length of tethers 124 and 126 of proof mass 100, while preserving the benefits of opening 112, namely that of reduced nonlinearity and improved damping.

An embodiment described herein comprises a transducer adapted to sense acceleration in at least two mutually orthogonal directions. The transducer includes at least two proof masses, each of which is suspended above a substrate by a distinct anchor system. A first proof mass may be a differential accelerometer fabricated as a teeter-totter structure for sensing acceleration in a first direction. Pivot elements of the anchor system for the first proof mass are physically located at the axis of rotation thereby largely eliminating the second order nonlinearity effect seen in some prior art designs having pivot elements that are offset from the axis of rotation. The first proof mass includes an opening and the second proof mass resides in the opening. The second proof mass may be a differential displacement accelerometer whose anchor system allows it to be displaced in response to acceleration in second and/or third mutually orthogonal directions, while remaining substantially parallel to the underlying substrate. The formation of the opening in the first proof mass results in an increase in rolloff frequency in the first direction without sacrificing the sensitivity of sensing in the first direction. In addition, placement of the second proof mass in the opening achieves a compact multiple axis transducer design to meet the demand for MEMS sensor applications requiring compact size and low cost packaging. The distinct anchor systems for each of the proof masses enable optimization of the corresponding torsional and linear spring elements while concurrently eliminating cross axis sensing.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A transducer adapted to sense acceleration in at least two mutually orthogonal directions comprising:
   a substrate;
   a first proof mass positioned in spaced apart relationship above a surface of said substrate and adapted for motion relative to a rotational axis, said first proof mass having an opening extending through said first proof mass;
   a first anchor system formed on said surface of said substrate, said first anchor system pivotally coupling said first proof mass to said substrate at said rotational axis to enable said first proof mass to rotate about said rotational axis in response to said acceleration in a first direction of said mutually orthogonal directions;
   a second proof mass residing in said opening and in spaced apart relationship above said surface; and
   a second anchor system formed on said surface of said substrate and coupled with said second proof mass to enable said second proof mass to move substantially parallel to said surface of said substrate in response to said acceleration in a second direction of said mutually orthogonal directions.

2. A transducer as claimed in claim 1 wherein said rotational axis is located at a centerline of said opening of said first proof mass.

3. A transducer as claimed in claim 1 wherein said opening of said first proof mass is defined by an inner peripheral wall, and said first anchor system comprises:
   a first pivot element attached to said first proof mass at a first side of said inner peripheral wall; and
   a second pivot element attached to said first proof mass at a second side of said inner peripheral wall, said second side of said inner peripheral wall opposing said first side of said inner peripheral wall.

4. A transducer as claimed in claim 1 wherein said first proof mass comprises first and second ends, a first section is formed between said rotational axis and said first end, a second section is formed between said rotational axis and said second end, said first section exhibiting a greater mass than said second section.

5. A transducer as claimed in claim 4 wherein said rotational axis of said first proof mass is offset between said first and second ends such that said first section exhibits a first length between said rotational axis and said first end that is greater than a second length of said second section between said rotational axis and said second end.

6. A transducer as claimed in claim 4 further comprising:
   a first electrode element formed on said surface of said substrate and facing said first section; and
   a second electrode element formed on said surface of said substrate and facing said second section, each of said first and second electrode elements being offset a substantially equivalent distance relative to said rotational axis, said each of said first and second electrode elements being adapted to sense said acceleration in said first direction perpendicular to said substrate.

7. A transducer as claimed in claim 1 wherein said second proof mass exhibits a centerline that is coaxial with said rotational axis of said first proof mass.

8. A transducer as claimed in claim 1 wherein said second anchor system comprises multiple spring elements offset from said rotational axis and symmetrically arranged relative to said rotational axis.

9. A transducer as claimed in claim 8 wherein said second proof mass exhibits a centerline that is substantially orthogonal to said rotational axis, and said multiple spring elements are symmetrically arranged relative to said centerline.

10. A transducer as claimed in claim 1 wherein said second anchor system enables said second proof mass to move substantially parallel to said surface of said substrate in response to said acceleration in a third direction of said mutually orthogonal directions.

11. A transducer as claimed in claim 10 wherein said second proof mass comprises:
a first set of sense fingers aligned with a first centerline of said second proof mass, said first centerline being orthogonal to said rotational axis, and said first set of sense fingers being adapted to sense said acceleration in said second direction; and
a second set of sense fingers aligned with a second centerline of said second proof mass, said second centerline being orthogonal to said first centerline and substantially parallel to said rotational axis, and said second set of sense fingers being adapted to sense said acceleration in said third direction.

12. A transducer as claimed in claim 11 wherein each of said sense fingers in said first and second set is disposed between two parallel fingers that are fixably attached to said surface of said substrate.

13. A transducer as claimed in claim 1 further comprising:
a third proof mass residing in said opening and in spaced apart relationship above said surface of said substrate; and
a third anchor system formed on said surface of said substrate and coupled with said third proof mass to enable said third proof mass to move substantially parallel to said surface in response to said acceleration in a third direction of said mutually orthogonal directions.

14. A transducer as claimed in claim 13 wherein each of said second and third proof masses is offset from a centerline of said opening, said rotational axis is coaxial with said centerline, and said first anchor system is positioned on said rotational axis between said second and third proof masses.

15. A transducer adapted to sense acceleration in at least two mutually orthogonal directions, said transducer comprising:
a substrate;
a first proof mass positioned in spaced apart relationship above a surface of said substrate and adapted for motion relative to a rotational axis, said first proof mass having an opening extending through said first proof mass, said opening exhibiting a first centerline that is coaxial with said rotational axis;
a first anchor system formed on said surface of said substrate, said first anchor system pivotally coupling said first proof mass to said substrate at said rotational axis to enable said first proof mass to rotate about said rotational axis in response to said acceleration in a first direction of said mutually orthogonal directions;
a second proof mass residing in said opening and in spaced apart relationship above said surface, said second proof mass exhibiting a second centerline that is coaxial with said first centerline; and
a second anchor system formed on said surface of said substrate and coupled with said second proof mass to enable said second proof mass to move substantially parallel to said surface of said substrate in response to said acceleration in a second direction of said mutually orthogonal directions.

16. A transducer as claimed in claim 15 wherein said first proof mass comprises first and second ends, a first section is formed between said rotational axis and said first end, a second section is formed between said rotational axis and said second end, said first section exhibiting a greater mass than said second section, and said first proof mass rotating about said rotational axis in response to said acceleration in said first direction perpendicular to said surface of said substrate.

17. A transducer as claimed in claim 15 wherein said second anchor system enables said second proof mass to move substantially parallel to said surface of said substrate in response to said acceleration in a third direction of said mutually orthogonal directions, said second and third directions being substantially parallel to said surface of said substrate.

18. A transducer adapted to sense acceleration in at least two mutually orthogonal directions, said transducer comprising:
a substrate;
a first proof mass positioned in spaced apart relationship above a surface of said substrate and adapted for motion relative to a rotational axis, said first proof mass having an opening extending through said first proof mass, said opening being defined by an inner peripheral wall;
a first anchor system formed on said surface of said substrate, said first anchor system pivotally coupling said first proof mass to said substrate at said rotational axis to enable said first proof mass to rotate about said rotational axis in response to said acceleration in a first direction of said mutually orthogonal directions, said first anchor system including a first pivot element attached to said first proof mass at a first side of said inner peripheral wall and a second pivot element attached to said first proof mass at a second side of said inner peripheral wall, said second side of said inner peripheral wall opposing said first side of said inner peripheral wall;
a second proof mass residing in said opening and in spaced apart relationship above said surface; and
a second anchor system formed on said surface of said substrate and coupled with said second proof mass to enable said second proof mass to move substantially parallel to said surface of said substrate in response to said acceleration in a second direction of said mutually orthogonal directions, said second anchor system including multiple spring elements offset from said rotational axis and symmetrically arranged relative to said rotational axis.

19. A transducer as claimed in claim 18 wherein said second proof mass exhibits a centerline that is substantially orthogonal to said rotational axis, and said multiple spring elements are symmetrically arranged relative to said centerline.

20. A transducer as claimed in claim 18 wherein said second anchor system enables said second proof mass to move substantially parallel to said surface of said substrate in response to said acceleration in a third direction of said mutually orthogonal directions.

* * * * *